Patented Feb. 17, 1931

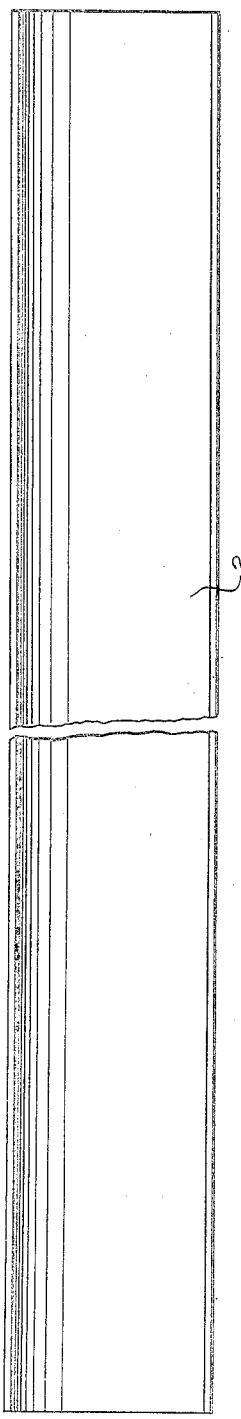
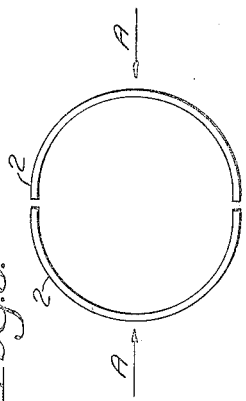
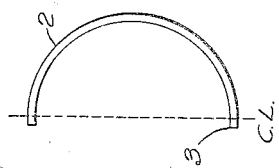
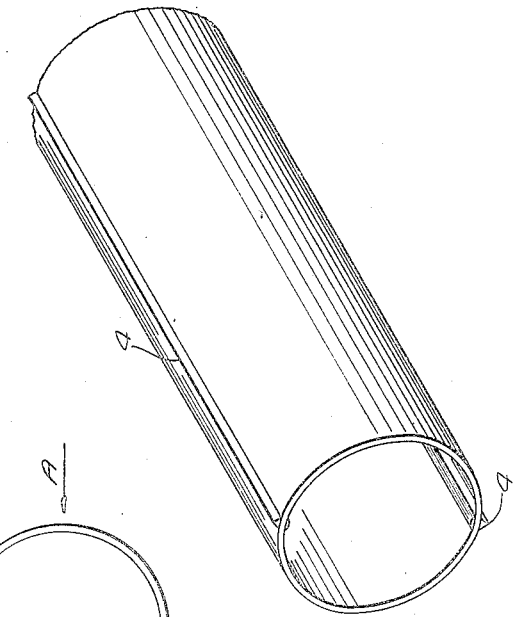

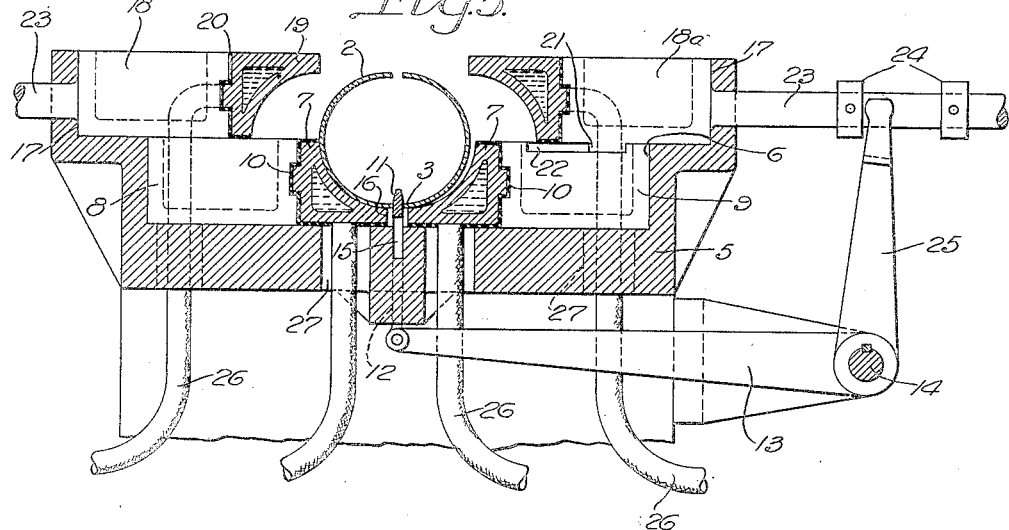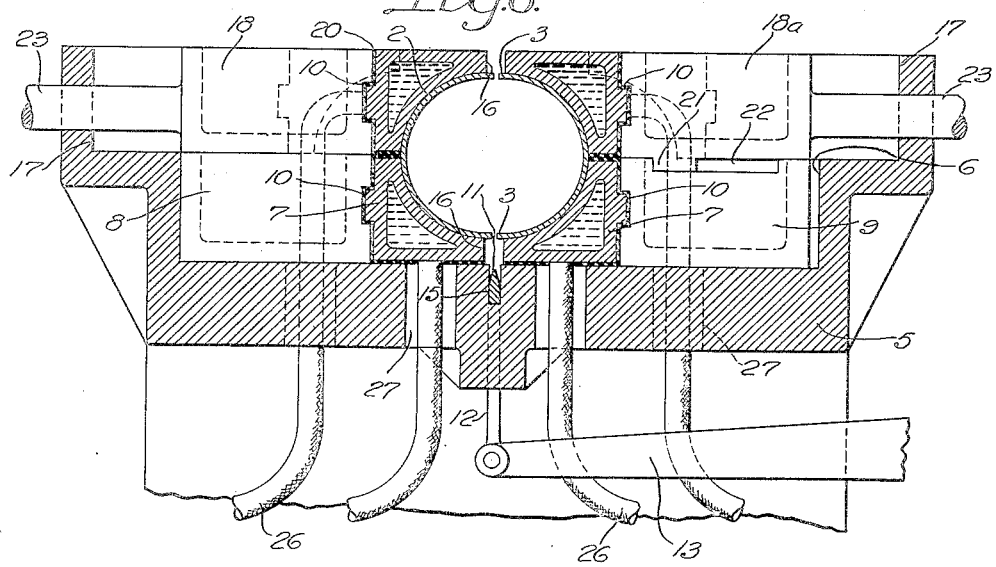

1,793,218

UNITED STATES PATENT OFFICE

JOHN W. FREE, OF ALIQUIPPA, PENNSYLVANIA, ASSIGNOR TO JONES & LAUGHLIN STEEL CORPORATION, OF PITTSBURGH, PENNSYLVANIA, A CORPORATION OF PENNSYLVANIA

APPARATUS FOR MAKING WELDED PIPE

Application filed July 16, 1928. Serial No. 293,260.

This invention relates to the manufacture of welded pipe and particularly to the manufacture of pipe for electric welding.

Various methods of making welded pipes have been proposed but most of them are open to numerous objections. In the larger sizes the skelp is of such great width that large rolling mills must be employed in its manufacture. It is generally necessary to shear the skelp so as to remove any cracks or other defects in the edges. A number of passes are required to shape the skelp to truly circular form and a large investment in machinery is necessary for this purpose.

The welding of such pipe, as heretofore carried out, has not been entirely satisfactory, has been expensive and has usually required special machinery.

I provide for forming a plurality of recessed sections adapted to be assembled into a pipe, bringing the edges of the sections into engagement, and applying a welding current and pressure to the sections so as to join them by longitudinal welds, thus forming a pipe. I employ resistance flash welding, there being no welding rod or other filler material required.

Since a plurality of segments are employed, the skelp may be rolled on smaller and narrower mills. As an example, the making of an 8 inch pipe with a single piece of skelp requires that the skelp be approximately 28 inches wide; whereas if it is made in sections by my method, it need be only approximately 14 inches wide if two segments are employed and relatively narrower if more segments are used.

During the rolling operation the edge of the skelp becomes somewhat rounded. This edge is reasonably smooth but usually possesses some slight irregularities. I preferably employ such rolled edges. The edges of the several segments are butted and the irregularities in such edges provide points where the burning action commences when the electric current is applied. During the burning and while the welding current is on, the edges are raised to a high temperature and the excess metal is burned away so that, upon the application of pressure, the edges of the segments are firmly welded.

The burning away of this excess metal along the edges eliminates any incipient cracks which may have occurred during the rolling operation so that a sound pipe is secured even though there has been no shearing. It will be understood that in some cases it may be desirable to shear the skelp to width, but by my method the shearing on one edge may be eliminated if desired. Material savings are also effected by reason of the fact that no special preparation of the edge is necessary. The edges need not be scarfed as in lap welding or recessed as in electric arc welding. Moreover, the skelp need not be of exact width as the pipe is automatically sized by the welding operation, the excess metal being simply burned away.

In practice I prefer to employ a welding apparatus of sufficient length to accommodate an entire pipe at one operation. A number of electrodes placed end to end will be employed and connected to a suitable source of welding current. I preferably employ upper and lower electrodes; the lower electrodes being movable apart a relatively short distance, and the upper electrodes being movable apart in a considerably greater distance so as to render the bottom electrodes accessible for the positioning of the pipe segments. A retractable guide is preferably employed, this guide being so placed as to position the pipe segments on the electrodes and being automatically withdrawable when the electrodes are brought together. I also preferably so interconnect the electrodes and the guide that the several electrodes completely embrace the pipe segments before the guide is withdrawn, thus insuring that the segments will remain in the proper position until the welding current is applied.

In the accompanying drawings illustrating the present preferred embodiment of my invention, Figure 1 is a side elevation, partly broken away, of a piece of pipe skelp, Figure 2 is an end view thereof, Figure 3 is a view showing two pieces of the pipe skelp of Figures 1 and 2 assembled and ready for welding, Figure 4 is a perspective view of the pipe formed by welding the two segments of Figure 3 together, Figure 5 is a transverse view through a welding apparatus for welding the segments together, the electrodes being shown in the open position, and Figure 6 is a similar view showing the electrodes in their closed position ready for the application of welding current and welding pressure.

Figures 1 and 2 show a segment 2 corresponding to substantially half the diameter of a pipe. In Figure 2, the center line C. L. of the circle to which the skelp is bent is shown so as to more clearly illustrate the fact that the skelp is more than a half circle. At each edge it is provided with excess metal 3 which, in a large measure, is burned away or goes into the flash formed during the welding operation. The skelp may be rolled to substantially the described width, for, as above pointed out, the irregularities in the edge and the condition of the edge imparted by rolling, are of advantage. If desired, the edge may be cleaned by any well-known method to remove the scale and thus insure a better initial contact.

Figure 3 shows two segments in assembled position ready for welding. In the manufacture of the pipe by my method the segments are held in the relative position of Figure 3 and pressure is applied along the direction of the arrows AA so as to bring the edges of the segments into contact. Welding current is supplied and the abutting edges are raised to high temperature. During the time that the current is on sufficient pressure is exerted to keep the edges in contact to burn away the excess metal and remove any irregularities in the edges. The edges are thus brought into intimate contact with one another and are raised to a high temperature so that additional pressure may be applied so as to bring the pipe to the desired size and complete the weld. This last step of applying the final pressure is carried out after the welding current has been shut off. The current raises the edges to sufficiently high temperature to insure that a perfect weld will be secured when the final pressure is applied.

During the time that the current is on, sufficient excess metal is burned away to insure that the irregularities will all be removed, any camber in the edges will be taken out and all cracks in the edges will be burned away. The final pressure sizes the pipe and produces a flash or bead along the line of the weld. This flash or bead is illustrated at 4 in Figure 4 and may be removed or not as required after the welding has been completed.

The welding apparatus shown in Figures 5 and 6 comprises a table 5 as long as the segments to be welded. It is provided with a bottom recess 6 to accommodate bottom electrodes 7 and supports 8 and 9 therefor. The electrodes are insulated from the table and from their supports, as indicated at 10. The support 8 and its electrode 7 are fixed, while the support 9 and its electrode 7 are movable to the right or the left, as viewed in Figures 5 and 6. The electrodes 7 are spaced apart a sufficient distance to accommodate a guide 11 carried on lifters 12, which in turn are pivoted to levers 13. The levers 13 are keyed to a shaft 14 running lengthwise of the table 5, so that when the shaft 14 is rocked the guide 11 is moved up or down. In its upper position the guide 11 lies above the lowermost working face of the electrodes 7, as shown in Figure 5, while in its lower position it lies in a slot 15 in the table 5, as shown in Figure 6.

The guide permits the accurate placing of the pipe segments 2 in the machine. It engages the bottom edges thereof and insures that they will be held in the proper position relative to the electrodes. The segments are so positioned on the electrodes 7 that the edges 3 constituting the excess metal project beyond the adjacent faces 16 of the electrodes 7.

The table 5 is provided with an upper recess 17 to accommodate slidable supports 18 and 18a for top electrodes 19. The top electrodes are insulated from the supports 18, as indicated at 20. The support 18a has a projection 21 on its lower face lying in a slot 22 in the support 9. The supports 18 and 18a are each provided with posts 23 having adjustable collars 24 thereon. The posts 23 are connected to any suitable actuating means such as a hydraulic cylinder, not shown, whereby the electrodes may be moved toward or away from the center line of the table. When the actuating means is operated so as to bring the top electrodes together they substantially completely surround the pipe segments and so embrace them that they cannot get out of position.

During the final movement of the support 18a the projection 21 engages the left hand end of the recess 22 and causes the support 9 and its electrode 7 to move toward its final position, thus insuring that all four electrodes will firmly engage the pipe skelp. During this movement also the right hand collar 24 engages a lever 25 keyed to the shaft 14, thus moving the levers 13 counter clockwise and withdrawing the guide 11 into the slot 15. Further movement of the posts 23 toward the axis of the pipe being formed brings the pipe edges into contact as shown in Figure 6. The apparatus is then ready for the application of welding current.

Each electrode is supplied with welding current from a suitable source through leads 26. The table 5 is slotted as indicated at 27 and the supports 8 and 9 are also slotted so as to accommodate the leads. The electrodes do not extend the full length of the pipe, but are made in sections, each provided with its own leads.

With the parts in the position of Figure 6, current is applied, thus bringing the edges up to a high heat and burning away excess metal. During this time sufficient pressure is applied through the posts 23 to bring the pipe segments progressively closer together. When sufficient excess metal has been burned away to insure that the application of final pressure will produce a welded pipe of proper size, the current is shut off and the final pressure is then applied. The step of applying pressure so as to force the segments together after the current has been shut off insures a much stronger weld than would otherwise be secured. This is of particular importance in pipe because of the strains to which pipe is subjected in subsequent operations, such as handling, and in service.

After the welds have been formed the posts 23 are retracted, thereby moving the top electrodes apart a sufficient distance to permit of removing the completed pipe, moving the bottom electrodes apart slightly and causing the guide 11 to rise and force the pipe out of the bottom electrodes. This is of advantage because the immediate removal of the pipe from the bottom electrodes by the guide 11 aids in keeping the electrodes sufficiently cool.

The electrodes are hollow, as shown in Figures 5 and 6. Suitable water connections (not shown) are provided for water cooling them.

The word "pipe" as used herein is used as a word of general definition and not of limitation and is intended to include what is known in the art as tubing.

I have illustrated and described a preferred embodiment of the invention. It will be understood however that it is not limited to the form shown as it may be otherwise embodied or practiced within the scope of the following claims.

I claim:

1. Apparatus for making welded pipe, comprising relatively movable electrodes, a guide for positioning pipe sections in the electrodes, means for moving the electrodes toward one another and means actuated by such movement for withdrawing the guide.

2. Apparatus for making welded pipe, comprising bottom electrodes movable toward and away from one another and top electrodes movable apart in a greater distance so as to render the bottom electrodes accessible for the positioning of pipe sections, the electrodes being of such shape that when they are brought together their working faces conform generally to the exterior cross sectional shape of the pipe to be formed.

3. Apparatus for making welded pipe, comprising bottom electrodes movable toward and away from one another, top electrodes movable apart in a greater distance and means for moving the top electrodes together independently of the bottom electrodes and thereafter substantially simultaneously moving the top and bottom electrodes together.

4. A flash-welding device for welding formed skelp comprising a table, lower electrodes fixed thereon and lower electrodes slidable therein, retractable upper electrodes, means whereby said slidable lower electrodes are actuated by the movement of said upper electrodes, a guide for positioning skelp within said electrodes and means actuated by said electrode movement for withdrawing said guide.

5. In a welding machine for uniting formed metallic lengths, the combination with a table, opposed lower electrodes, one of said electrodes being retractable, opposed upper electrodes slidable on said table, of means whereby one of the upper electrodes actuates the retractable lower electrode, a guide for locating the skelp within the electrodes and means actuated by the electrodes for withdrawing the guide.

6. In a welding machine for uniting formed metallic lengths, the combination with a table, opposed lower electrodes, one of said electrodes being retractable, opposed upper electrodes slidable on said table, of means whereby one of the upper electrodes actuates the retractable lower electrode.

7. In a welding machine for uniting metallic members, laterally shiftable upper and lower electrodes, means for actuating the upper electrodes and means whereby the lower electrodes are thereby actuated.

8. In a welding machine, a plurality of shiftable electrodes for engaging the members to be welded, and means whereby movement of one of said electrodes effects a corresponding movement of another of said electrodes.

In testimony whereof I have hereunto set my hand.

JOHN W. FREE.